July 13, 1937. W. H. BASELT 2,086,842
CLASP BRAKE
Filed Oct. 23, 1936 3 Sheets-Sheet 1
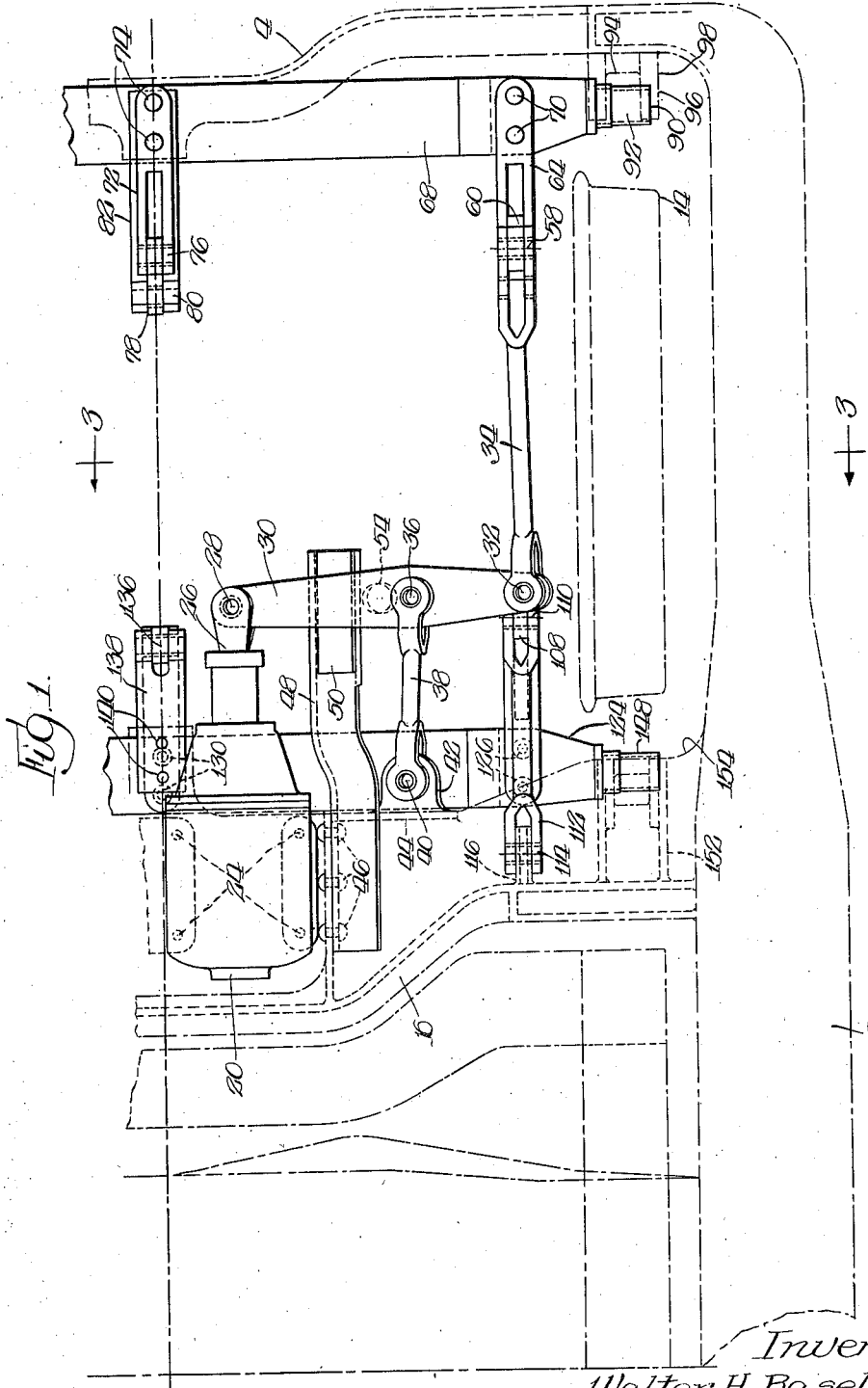
Inventor:
Walter H. Baselt,
By Orin O. B. Garner Atty.

July 13, 1937.　　　W. H. BASELT　　　2,086,842
CLASP BRAKE
Filed Oct. 23, 1936　　　3 Sheets-Sheet 2
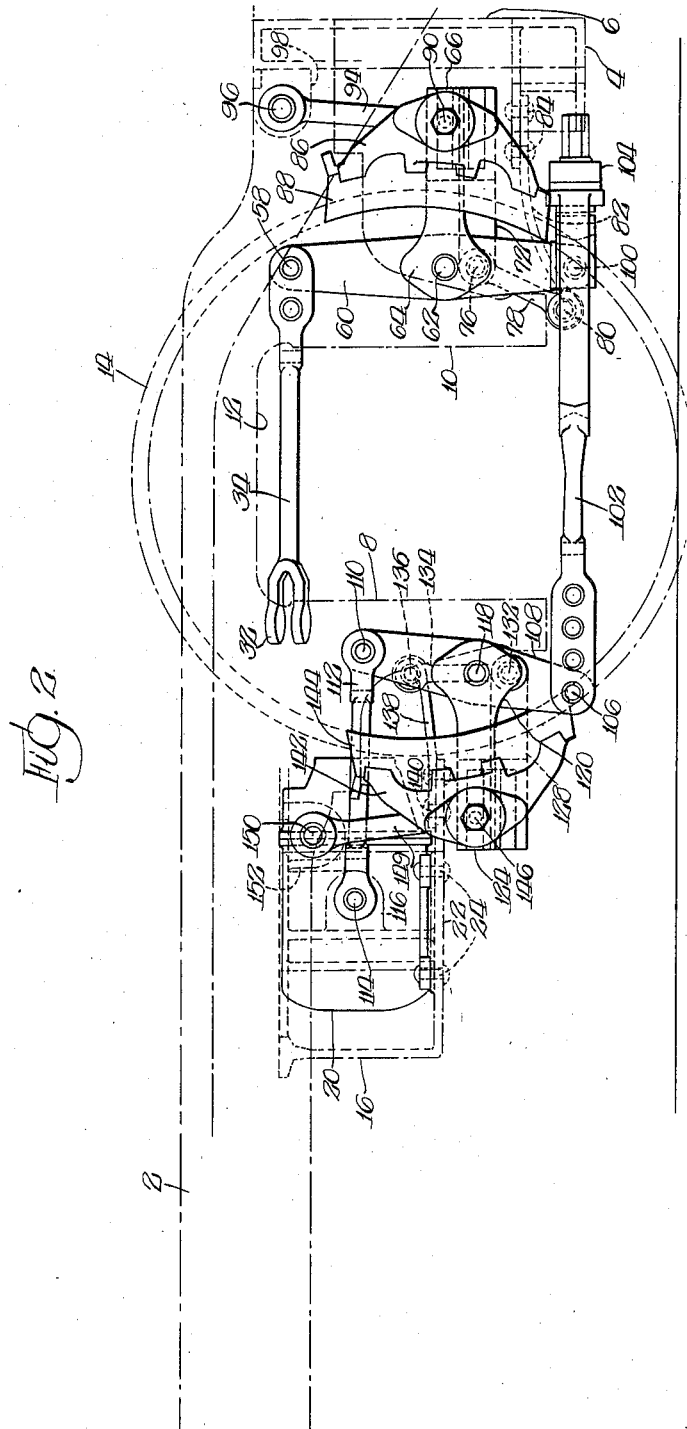
Inventor:-
Walter H. Baselt,
By Orin O. Garner  Atty

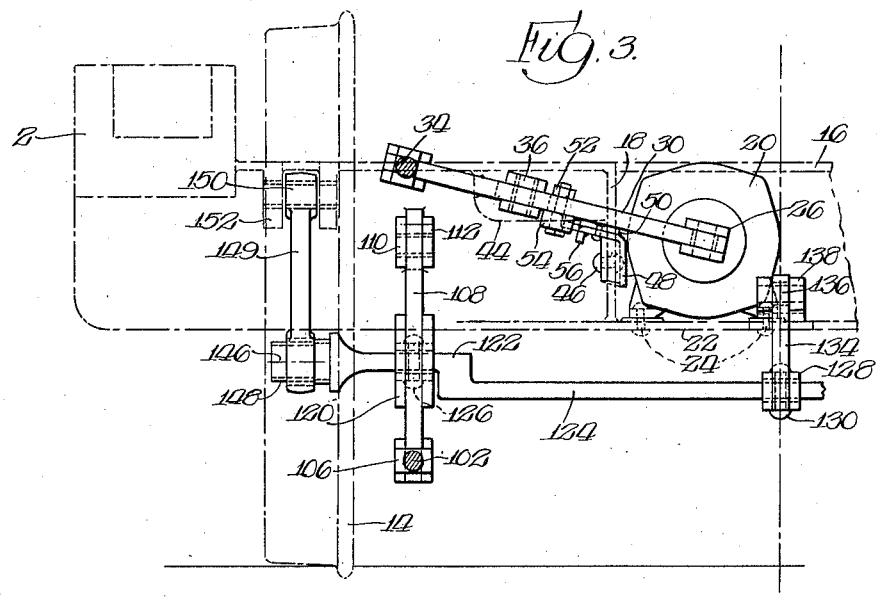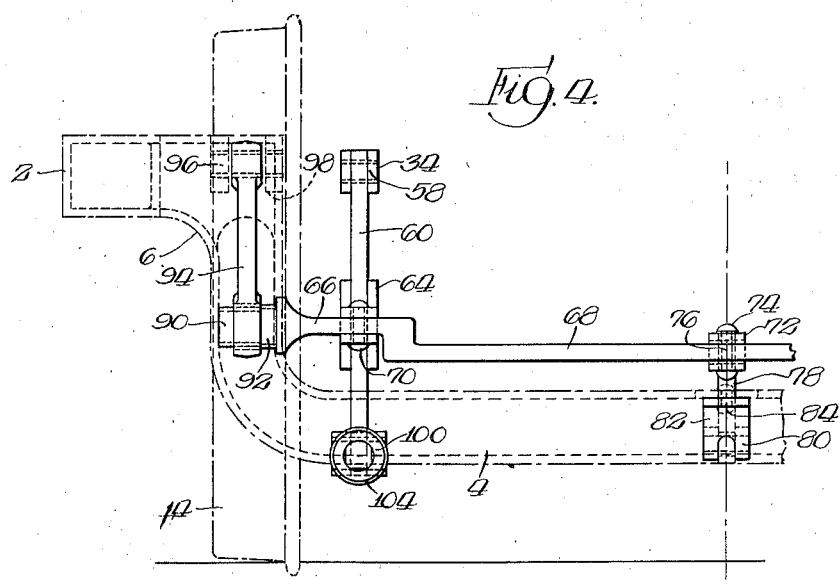

Patented July 13, 1937

2,086,842

UNITED STATES PATENT OFFICE 2,086,842

CLASP BRAKE

Walter H. Baselt, Chicago, Ill., assignor to American Steel Foundries, Chicago, Ill., a corporation of New Jersey Application October 23, 1936, Serial No. 107,271

20 Claims. (Cl. 188—56)

My invention relates to railway brake equipment and more particularly to a type of such equipment commonly known as clasp brakes wherein brake heads and shoes are applied to opposite sides of each car wheel.

An object of my invention is to provide a novel form of clasp brake rigging for a so-called articulated truck which is designed to support adjacent ends of two car bodies.

A further object is to provide clasp brake equipment suitable for an articulated truck having an exceptionally low center of gravity and a relatively long wheel base.

A still further object of my invention is to provide a clasp brake rigging for an articulated truck having a low center of gravity wherein the rigging will be actuated by separate power means at the opposite ends of the truck and wherein the rigging at the respective ends of the truck will be mounted independently.

Yet another object is to provide a clasp brake rigging for an articulated truck wherein the end rails are disposed at a very low level as compared with the position of the side members of the car truck.

With these and various other objects in view, my invention may consist of certain novel features of construction and operation as will be more fully described and particularly pointed out in the specification, drawings and claims appended hereto.

In the drawings which illustrate embodiments of the invention and wherein like reference characters are used to designate like parts—

Figure 1 is a top plan view of a truck and brake structure embodying my invention, only one side of the structure being shown at one end of the truck inasmuch as the construction is the same at the opposite sides and at the respective ends thereof;

Figure 2 is a side elevation of the truck and brake structure shown in Figure 1;

Figure 3 is a sectional view, the section being taken substantially in the transverse vertical plane indicated by line 3—3 of Figure 1; and Figure 4 is an end elevation, the view being taken at the right of the structure shown in Figures 1 and 2.

The truck structure comprises the side frames 2 integrally joined at their opposite ends by end rails 4, the junctures of the side members and the end rails at the four corners of the truck comprising a substantially vertically disposed portion 6, said portion serving to unite integrally the side members and the end rails. It will be observed that the end rails are disposed at a very low level, a relatively short distance above the track level as compared with the side members. This facilitates the desirable form of body structure in the recently developed high-speed trains having unusually low centers of gravity. Adjacent each end, each side member has the integrally formed column guides 8 and 10 forming therebetween the opening 12 and serving as the usual means of connection with the journal box (not shown) of the wheel and axle assembly 14.

On opposite sides of the transverse center line of the truck are the spaced transoms 16 integrally formed with the side members of the truck, said transoms providing the usual form of support for the bolster upon which the car body is supported in the well known manner.

Adjacent the longitudinal center line of the truck and between the spaced vertical walls 18 disposed on opposite sides thereof are located the brake cylinders or power means 20 secured in position upon the bottom plate 22 of the transom as by rivet means 24. The piston 26 of the power means 20 is pivotally connected as at 28 to the diagonally arranged cylinder lever 30, the opposite end of said cylinder lever being pivotally connected as at 32 to the pull rod 34. Intermediate the ends of the cylinder lever 30 is pivotally connected as at 36 the fulcrum means 38, the opposite end of said fulcrum means being pivotally connected as at 40 to the bracket 42 integrally formed with the gusset 44, said gusset also forming a reinforcing means between the vertical wall 18 and the top plate of the transom. Secured to the vertical wall 18 as by the rivets 46—46 is the elongated angle iron 48 having on its top surface the wear plate 50 and forming a support and guide means for the cylinder lever 30. Adjacent the angle iron 48 the cylinder lever 30 has the bolt and nut assembly 52 securing anti-frictional means, in the form of the roller 54, having engagement with the outer face 56 of the angle iron 48 and serving to retain the cylinder lever 30 in its proper position laterally of the truck.

The outer end of the pull rod 34 is pivotally and adjustably connected as at 58 to the live truck lever 60, said live truck lever being pivotally connected intermediate its ends as at 62 to the fulcrum 64, said fulcrum being secured to the offset end 66 of the brake beam 68 as by the rivet means 70. Adjacent the longitudinal center line of the truck the brake beam 68 has the fulcrum 72 secured thereto as by rivets 74, the outer end of said fulcrum having the pivotal connection as at 76 with the link 78, the opposite end of said link being pivotally secured as at 80 to one end of the spring bracket 82, the other end of said spring bracket being secured to the top plate of the end rail 4 as by means of rivets 84. The brake head 86 with its associated brake shoe 88 arranged for cooperation with the adjacent wheel are pivotally supported as at 90 upon the trunnion end 92 of the brake beam 68; and also connected at the pivotal point 90 is the lower end of the hanger 94 serving as supporting means for the brake rigging outwardly of the wheel, said hanger being pivotally supported at its upper end as at 96 from the bracket 98 integrally formed with the truck frame adjacent the juncture of the side member 2 and the vertical portion 6 of the end rail 4.

The lower end of the live truck lever 60 is pivotally connected as at 100 to the pull rod 102, the connection therebetween being made adjustable as by the slack adjuster 104, and the opposite end of the pull rod 102 is pivotally and adjustably connected as at 106 to the lower end of the dead truck lever 108, the upper end of said dead truck lever being pivotally connected as at 110 to the fulcrum link 112, the opposite end of said fulcrum link being pivotally connected as at 114 to the bracket 116 integrally formed on the transom 16. Intermediate its ends as at 118 the dead truck lever 108 is pivotally connected to the fulcrum 120, said fulcrum being secured to the offset end 122 (Figure 3) of the beam 124, the rivets 126 serving as securing means. Adjacent the longitudinal center line of the truck the beam 124 has the fulcrum 128 secured thereto as by rivets 130, the projecting end of said fulcrum 128 having a pivotal connection as at 132 to the lower end of the link 134, the upper end of said link being pivotally connected as at 136 to the outer end of the spring bracket 138, said spring bracket being secured to the lower transom plate 22 as by means of rivets 140. The brake head 142 supporting the brake shoe 144 for cooperation with the adjacent wheel is pivotally mounted as at 146 on the trunnion end 148 of the brake beam 124 and likewise at the pivotal point 146 is connected the lower end of the hanger 149, the upper end of which is pivotally connected as at 150 to the bracket 152 integrally formed with the gusset 154 reinforcing the juncture of the transom 16 and the side frame 2.

It will be understood, of course, that the power means 20 operates in conjunction with an associated power means mounted on the same load carrying member at the opposite side of the longitudinal center line of the truck, the two power means thus actuating the brake rigging at one end of the truck. Likewise the brake rigging at the opposite end of the truck is actuated by a plurality of power means similarly mounted on the load carrying member at the other end of the truck.

The brake beams intermediate the wheels are retained in proper balance by the spring brackets 138, the links 134 providing connections between said spring brackets and the fulcrums 128 secured to the mid-points of said beams. Likewise each beam outwardly of the wheels is held in proper balance by the spring bracket 82 secured to the end rail 4, connection to said spring bracket being in the form of the link 78 which is secured at its opposite end to the fulcrum 72 on the middle of the beam 68.

In operation actuation of the power means 20 moves the piston 26 to the right and causes the cylinder lever 30 to rotate in a clockwise direction about the pivot 36 intermediate its ends, thus moving to the left (Figures 1 and 2) the pull rod 34 and rotating the live truck lever 60 in a counter-clockwise direction about the pivot 100 at its lower end, thus moving the brake beam 68 to the left (Figure 1) and bringing the brake shoe 88 mounted thereon into engagement with the periphery of the adjacent wheel. Continued actuation causes the live truck lever 60 to rotate in a counter-clockwise direction about the pivot 62 intermediate its ends and causing the pull rod 102 to move to the right and, through the connection of said pull rod 102 with the lower end of the dead truck lever 108, causing said dead truck lever to rotate in a counter-clockwise direction about the pivot 110 at its upper end and thus moving the brake beam 124 to the right and bringing the brake shoe 144 carried by said beam into engagement with the opposite periphery of said wheel. Release of the power means will cause the brake rigging to return to its normal inoperative position.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In brake rigging for a railway car truck the combination of a truck frame comprising side frames and a load carrying member, a wheel and axle assembly, a plurality of power means supported on said load carrying member adjacent the longitudinal center line of said truck, brake beams supported at opposite sides of said wheel and axle assembly, dead truck levers supported inwardly of the wheels and pivotally connected intermediate their ends to the adjacent beam, live truck levers supported outwardly of the wheels and connected intermediate their ends to the adjacent beam, pivotal and adjustable connections between the lower ends of the live and dead truck levers associated with each wheel, angularly arranged cylinder levers having their inner ends connected respectively to said power means and their outer ends operatively connected respectively to said live truck levers, and support means secured to said load carrying member adjacent each of said cylinder levers, said cylinder levers being slidably supported thereon, and means on said cylinder levers providing antifrictional engagement between said cylinder levers and said support means.

2. In brake rigging for a railway car truck the combination of a truck frame comprising side frames and a load carrying member, a wheel and axle assembly, a plurality of power means supported on said load carrying member adjacent the longitudinal center line of said truck, brake beams supported at opposite sides of said wheel and axle assembly, dead truck levers supported inwardly of the wheels and pivotally connected intermediate their ends to the adjacent beam, live truck levers supported outwardly of the wheels and connected intermediate their ends to the adjacent beam, pivotal and adjustable connections between the lower ends of the live and dead truck levers associated with each wheel, and dead cylinder levers fulcrumed intermediate their ends from said load carrying member adjacent its opposite ends respectively, the inner ends of said cylinder levers being connected respectively to said power means and the outer ends thereof pivotally and adjustably connected respectively to said live truck levers.

3. In brake rigging for a railway car truck the combination of a truck frame comprising side frames and a load carrying member, a wheel and axle assembly, a plurality of power means supported on said load carrying member adjacent the longitudinal center line of said truck, brake beams supported at opposite sides of said wheel and axle assembly, dead truck levers supported inwardly of the wheels and pivotally connected intermediate their ends to the adjacent beam, live truck levers supporting outwardly of the wheels and connected intermediate their ends to the adjacent beam, pivotal and adjustable connections between the lower ends of the live and dead truck levers associated with each wheel, and cylinder levers having their inner ends pivotally connected respectively to said power means, points intermediate their ends fulcrumed from said load carrying member, and their outer ends pivotally and adjustably connected to said live truck levers.

4. In brake rigging for a railway car truck the combination of a truck frame comprising a side member and a load carrying member, a wheel and axle assembly, a plurality of power means supported from said load carrying member adjacent the longitudinal center line of the truck and on opposite sides thereof, fulcrum means on said load carrying member adjacent the opposite ends thereof, live truck levers supported outwardly of said assembly, dead truck levers supported inwardly of said assembly, pull rods connecting said truck levers adjacent each wheel, cylinder levers having their inner ends connected respectively to said power means and their outer ends operatively and adjustably connected respectively to said live truck levers, and pivotal connections respectively between points intermediate the ends of said cylinder levers and the adjacent fulcrum means.

5. In a railway car truck the combination of a truck frame comprising a transverse load carrying member, a plurality of power means mounted thereon, a wheel and axle assembly, live truck levers supported outwardly of said assembly, dead truck levers supported inwardly of said assembly, pull rods adjustably connected between each pair of said live and dead truck levers at opposite sides of said assembly, brake beams connected to the corresponding truck levers at opposite sides of the truck at points intermediate the ends of said levers, fulcrum means pivotally connected to said load carrying member on opposite sides of said power means, and cylinder levers pivotally connected intermediate their ends to said fulcrum means respectively, said cylinder levers having their inner ends connected respectively to said power means and their outer ends operatively connected respectively to said live truck levers.

6. In a railway car truck the combination of a truck frame comprising a transverse load carrying member, a plurality of power means mounted thereon, a wheel and axle assembly, live truck levers supported outwardly of said assembly, dead truck levers supported inwardly of said assembly, pull rods adjustably connected between said live and dead truck levers adjacent each wheel, brake beams connected to the corresponding truck levers at opposite sides of the truck at points intermediate the ends of said levers, and a pair of cylinder levers fulcrumed from said load carrying member on opposite sides of said power means, said cylinder levers having their inner ends connected respectively to said power means and their outer ends operatively and adjustably connected respectively to the upper ends of said live truck levers.

7. In a railway car truck the combination of a truck frame comprising side frames, integrally formed end rails, spaced transoms connecting said side frames on opposite sides of the transverse center line of the truck, wheel and axle assemblies, power means supported on each of said transoms, and brake rigging comprising brake beams supported on opposite sides of each wheel and axle assembly, cylinder levers respectively fulcrumed adjacent the opposite ends of each of said transoms, pairs of live and dead truck levers supported on opposite sides of each of said assemblies, each of said truck levers being connected intermediate its ends to one of said beams and the levers of each pair having their lowers ends connected to each other, and pull rods connecting the upper ends of said live truck levers respectively to the outer ends of said cylinder levers.

8. In a railway car truck the combination of a truck frame comprising side frames, integrally formed end rails, spaced transoms connecting said side frames on opposite sides of the transverse center line of the truck, wheel and axle assemblies, power means supported on each of said transoms, and brake rigging comprising brake beams supported on opposite sides of each wheel and axle assembly, cylinder levers respectively fulcrumed adjacent the opposite ends of each of said transoms, pairs of live and dead truck levers supported on opposite sides of each of said assemblies, each of said truck levers being connected intermediate its ends to one of said beams and the levers of each pair having their lower ends connected to each other, and operative connections between said cylinder levers respectively and said live truck levers.

9. In brake rigging for a railway car truck the combination of a truck frame comprising side members and a transverse load carrying member, a wheel and axle assembly, power means supported from said load carrying member, brake beams supported on opposite sides of said assembly, a pair of live and dead truck levers supported adjacent each wheel and having their lower ends connected to each other, a connection between each of said truck levers and the adjacent beam at a point intermediate the ends of the lever, and cylinder levers fulcrumed from said load carrying member adjacent its opposite ends, said cylinder levers having their inner ends connected to said power means and their outer ends connected respectively to said live truck levers.

10. In brake rigging for a railway car truck the combination of a truck frame comprising side members and a transverse load carrying member, a wheel and axle assembly, power means supported from said load carrying member, brake beams supported on opposite sides of said assembly, a pair of live and dead truck levers supported adjacent each wheel and having their lower ends connected to each other, a connection between each of said truck levers and the adjacent beam at a point intermediate the ends of the lever, and cylinder levers fulcrumed intermediate their ends and having their outer ends connected respectively to said live truck levers and their inner ends operatively connected to said power means.

11. In brake rigging for a railway car truck the combination of a truck frame comprising side frames and a load carrying member, a wheel and axle assembly, a plurality of power means supported on said load carrying member adjacent the longitudinal center line of said truck, brake beams supported at opposite sides of said wheel and axle assembly, dead truck levers supported inwardly of the wheels and pivotally connected intermediate their ends to the adjacent beam, live truck levers supported outwardly of the wheels and connected intermediate their ends to the adjacent beam, pivotal and adjustable connections between the lower ends of the live and dead truck levers associated with each wheel, and cylinder levers having their inner ends connected respectively to said power means and their outer ends operatively connected to said live truck levers.

12. In a railway car truck the combination of a truck frame comprising side members and transverse load carrying members, wheel and axle assemblies, a plurality of power means mounted on each of said load carrying members, live truck levers supported outwardly of the wheels, dead truck levers supported intermediate the wheels, pull rods connecting the lower ends of the truck levers adjacent each wheel, brake beams connected between the corresponding truck levers at opposite sides of the truck, pairs of cylinder levers having their inner ends connected respectively to said power means and points intermediate their ends fulcrumed adjacent opposite ends of said load carrying members, and pull rods adjustably connecting the outer ends of said cylinder levers respectively to said live truck levers.

13. In brake rigging for a railway car truck the combination of a truck frame comprising side members and transverse load carrying members, wheel and axle assemblies, a plurality of power means mounted on each of said load carrying members adjacent the longitudinal center line of the truck, fulcrum means secured to each of said load carrying members outwardly of said power means, live and dead truck levers supported adjacent each wheel on opposite sides thereof and adjustably connected at their lower ends, and pairs of cylinder levers having their inner ends connected respectively to said power means and their outer ends adjustably connected respectively to said live truck levers, each of said cylinder levers being pivotally connected intermediate its ends to the adjacent fulcrum means.

14. In a railway car truck the combination of a truck frame comprising spaced load carrying members, a plurality of power means mounted on each of said load carrying members, wheel and axle assemblies, pairs of live and dead truck levers supported on opposite sides of each of said assemblies, pull rods connecting the lower ends of the truck levers adjacent each wheel, brake beams connected to corresponding truck levers on opposite sides of the truck, and a pair of cylinder levers fulcrumed on each of said load carrying members on opposite sides of the associated means, the cylinder levers of each pair having their inner ends connected respectively to the adjacent power means and their outer ends connected respectively to said live truck levers at one end of the truck.

15. In a railway car truck the combination of a truck frame comprising a load carrying member, power means mounted thereon, a wheel and axle assembly, live truck levers supported outwardly of said assembly, dead truck levers supported inwardly of said assembly, pull rods connecting the lower ends of said live and dead levers adjacent each wheel, brake beams connected between corresponding brake levers at opposite sides of the truck, and cylinder levers fulcrumed to said load carrying member on opposite sides of said power means, said cylinder levers having their inner ends connected to said power means and their outer ends operatively and adjustably connected respectively to said live truck levers.

16. In a railway car truck the combination of a truck frame comprising a transverse load carrying member, a plurality of power means mounted thereon, fulcrum means secured to said load carrying member outwardly of said power means, live truck levers supported outwardly of said assembly, dead truck levers supported inwardly of said assembly, pull rods connecting said live and dead levers adjacent each wheel, and cylinder levers pivotally secured respectively to said fulcrum means at points intermediate their ends and having their inner ends connected respectively to said power means and their outer ends connected respectively to said live truck levers through the medium of pull rods.

17. In brake rigging for a railway car truck the combination of a truck frame comprising a side member and a load carrying member, a wheel and axle assembly, a plurality of power means supported from said load carrying member adjacent the longitudinal center line of the truck and on opposite sides thereof, live truck levers supported outwardly of said assembly, dead truck levers supported inwardly of said assembly, pull rods connecting said truck levers adjacent each wheel, and cylinder levers having their inner ends connected respectively to said power means and their outer ends operatively and adjustably connected respectively to said live truck levers.

18. In a railway car truck the combination of a truck frame comprising a load carrying member, a wheel and axle assembly, power means mounted on said load carrying member, pairs of live and dead levers supported on opposite sides of said assembly adjacent each wheel and connected at their lower ends to each other, brake beams connected to the corresponding truck levers on opposite sides of the truck, and diagonally arranged cylinder levers fulcrumed intermediate their ends from said load carrying member and having their outer ends connected respectively to said live truck levers and their inner ends connected respectively to said power means.

19. In a railway car truck the combination of a truck frame comprising side members and transverse load carrying members, wheel and axle assemblies, a plurality of power means mounted on each of said load carrying members, live truck levers supported outwardly of the wheels, dead truck levers supported intermediate the wheels, pull rods connecting the lower ends of the truck levers adjacent each wheel, brake beams connected between the corresponding truck levers at opposite sides of the truck, and pairs of cylinder levers having their inner ends connected respectively to said power means and their outer ends operatively connected respectively to said live truck levers.

20. In a railway car truck the combination of a truck frame comprising a load carrying member, a wheel and axle assembly, power means mounted on said load carrying member, pairs of live and dead levers supported on opposite sides of said assembly adjacent each wheel and connected at their lower ends to each other, brake beams connected to the corresponding truck levers on opposite sides of the truck, and diagonally arranged dead levers having their outer ends connected respectively to said live truck levers and their inner ends connected to said power means.

WALTER H. BASELT.